(12) United States Patent (10) Patent No.: US 7,474,330 B2
Wren et al. (45) Date of Patent: *Jan. 6, 2009

(54) SYSTEM AND METHOD FOR INTEGRATING AND CHARACTERIZING DATA FROM MULTIPLE ELECTRONIC SYSTEMS

(75) Inventors: Andrew Wren, Atlanta, GA (US); Christopher Ashe, Duluth, GA (US); Scott Fairbairn, Alpharetta, GA (US); Kenneth Dutch Schultz, Roswell, GA (US)

(73) Assignee: Wren Associates, Ltd., Jefferson City, MO (US)

( * ) Notice: Subject to any disclaimer, the term of this patent is extended or adjusted under 35 U.S.C. 154(b) by 968 days.

This patent is subject to a terminal disclaimer.

(21) Appl. No.: 10/742,607

(22) Filed: Dec. 19, 2003

(65) Prior Publication Data

US 2004/0155960 A1 Aug. 12, 2004

Related U.S. Application Data

(63) Continuation-in-part of application No. 10/125,587, filed on Apr. 19, 2002, now Pat. No. 6,847,393.

(51) Int. Cl.
*H04N 7/18* (2006.01)
*H04N 9/47* (2006.01)
(52) U.S. Cl. ............................ 348/150; 700/83; 348/61
(58) Field of Classification Search ................ 348/150, 348/143, 169, 152, 153, 154, 155, 158, 159, 348/149, 151, 156, 157, 61, 512, 513; 386/35, 386/4, 52, 46, 61, 62, 64, 66, 95, 112, 117, 386/109, 111, 125, 126; 700/17, 83, 318
See application file for complete search history.

(56) References Cited

U.S. PATENT DOCUMENTS

| 4,145,715 A | 3/1979 | Clever |
| 4,337,482 A | 6/1982 | Coutta |
| 4,630,110 A | 12/1986 | Cotton et al. |
| 5,216,502 A | 6/1993 | Katz |

(Continued)

OTHER PUBLICATIONS

PCT International Searching Authority (ISA)/US, PCT International Search Report, International Application No. PCT/US03/10771, Date of actual completion: Jun. 13, 2002, Date of mailing: Jul. 22, 2003, Washington, DC.

*Primary Examiner*—Behrooz Senfi
(74) *Attorney, Agent, or Firm*—Dority & Manning, P.A.

(57) ABSTRACT

A computer-based platform is provided for integrating data from multiple systems including (but not limited to) point of sale (POS) terminals, video systems, electronic article surveillance (EAS) systems, automatic teller machines (ATMs), gas pumps, alarm systems, radio frequency identification (RFID) detection systems, etc. The subject computer-based platform is configured to gather and correlate data (e.g., transactional data and/or video data), package such data into multiple discrete system "events", and to provide various features for proactively identifying selected events as "exceptions". Additional aspects of the computer-based platform may be utilized to provide signaled identification to a user of identified exceptions and other integrated system data. Still further aspects of the platform can be used to group these new events to create larger groupings of multiple transactions, events, data, exceptions, and/or research. This larger grouping can be derived from similar or diverse input systems and can be treated as a new entity that can be acted on independently.

36 Claims, 12 Drawing Sheets

U.S. PATENT DOCUMENTS

| | | | |
|---|---|---|---|
| 5,895,453 A | 4/1999 | Cook | |
| 5,915,069 A | 6/1999 | Nishijima | |
| 6,035,341 A | 3/2000 | Nunally et al. | |
| 6,075,560 A | 6/2000 | Katz | |
| 6,144,375 A * | 11/2000 | Jain et al. | 345/302 |
| 6,330,025 B1 * | 12/2001 | Arazi et al. | 348/143 |
| 6,421,080 B1 | 7/2002 | Lambert | |
| 6,542,075 B2 | 4/2003 | Barker et al. | |
| 6,617,969 B2 * | 9/2003 | Tu et al. | 340/517 |
| 6,847,393 B2 * | 1/2005 | Ashe et al. | 348/61 |
| 2002/0075307 A1 | 6/2002 | Alexander et al. | |
| 2002/0143923 A1 * | 10/2002 | Alexander | 709/223 |
| 2002/0178013 A1 * | 11/2002 | Hoffman et al. | 705/1 |
| 2003/0107649 A1 * | 6/2003 | Flickner et al. | 348/150 |

* cited by examiner

USER-CUSTOMIZED HEADER ⑧

Welcome User. Today's date is _____. LOGOUT | HELP

In Box
Exceptions
Research
Services
Reports
Configuration
Security

① Exception >> Hand-Keyed Item - 5 Events [RETURN] [MARK AS REVIEWED] ⑦

Event Type: Transaction   Detection Date: 03/13/2002   Employee: Chris Ashe   Threshl ② Overview | Notes | Video   Event Date/Time: 03/13/2002 10:22:13   Register: 200 - Test

Event Detail ③
| | |
|---|---|
| Beginning Date/Time | 03/13/2002 10:22:13 |
| Description | Hand-Keyed Item |
| Priority | Normal |
| Notes | None |
| Video | Yes |
| Register | 200 - Test Register |
| Employee | 2 - Chris Ashe |
| Amount | $0.01 |

⑤

Video
Request: 1 - Overhead, 10:22:12, 3 s ⑥
Video Speed: Normal
03/13/2002 10:22:14 - Frame 14 of 14

④ Transaction Data
| Time | Description | Amt |
|---|---|---|
| 10:22:13 | Transaction Start | |
| 10:22:13 | K Item Number 3 | 0.01 |
| 10:22:13 PR | Item Number 3 | 0.01 |
| 10:22:14 | K Cash | 0.01 |
| 10:22:14 | Transaction Total | 0.01 |

① Exception Header with key Information

② Broken into 3 areas: Overview, Notes and Video Segments associated to this event ③ Key event information from the transaction ④ An actual view of the TS data for the entire transaction ⑤ Link notes on the employee ⑥ Timeslice of digital video correlated to the specific event ⑦ Button to mark the Event as "Reviewed"

⑧ Heading with User-Customized Information and Interface Links

*FIG. 10*

SYSTEM AND METHOD FOR INTEGRATING AND CHARACTERIZING DATA FROM MULTIPLE ELECTRONIC SYSTEMS

PRIORITY CLAIM TO RELATED APPLICATIONS

This application claims the benefit of priority as a continuation-in-part application of previously filed U.S. Utility patent application Ser. No. 10/125,587 entitled "METHOD AND SYSTEM FOR MONITORING POINT OF SALE EXCEPTIONS", filed Apr. 19, 2002, now U.S. Pat. No. 6,847,393 which is incorporated herein by reference for all purposes.

BACKGROUND OF THE INVENTION

The presently disclosed technology generally concerns acomputer-based platform for integrating data from multiple systems including (but not limited to) point of sale (POS) terminals, video systems, electronic article surveillance (EAS) systems, automatic teller machines (ATMs), gas pumps, alarm systems, radio frequency identification (RFID) detection systems, etc. The subject computer-based platform is configured to gather and correlate data (e.g., transactional data and/or video data), package such data into multiple discrete system "events", and to provide various features for proactively identifying selected events as "exceptions". Additional aspects of the computer-based platform may be utilized to provide signaled identification to a user of identified exceptions and other integrated system data.

The ability to integrate and characterize data from multiple electronic systems can provide advantageous utility for a variety of different applications. For example, in a retail environment, certain types or patterns of employee or customer behavior at the register can be closely associated with fraud, theft or insufficient training. These types of behaviors generally result in a monetary loss by the owner of the retail business. As such, data monitoring and characterization of register transactions may be useful for loss prevention applications. Furthermore, transaction information from a point of sale terminal, especially specific information regarding identification of tendered items, is invaluable data for merchandizing and marketing applications. Video data corresponding to such transactional information may be utilized to evaluate customer demographics for marketing applications. Video data may also be analyzed in a transactional environment for operations applications, for example, to monitor register line counts, customer traffic patterns, etc. or for training applications to ensure employees maintain accepted performance levels. Additional applications may involve the integration and characterization of video and/or event data as related to security, safety, and liability issues.

Analyzing integrated system data, especially in retail environments, and searching for such events as those that characterize questionable employee behavior is gaining popularity among large retail organizations but is typically not practiced by less sophisticated organizations. Many organizations outsource this analysis and refer to it as "Data Mining" or "Exception Reporting". In-house or third party systems presently in place are somewhat cumbersome and inefficient. The process of collecting the data from a multitude of geographically diverse locations, analyzing the data according to rigid guidelines, producing a written report, and distributing the written report can take several days and be very expensive. Further, the distributed Exception Reports are not typically tied to video data captured by surveillance systems in the store, as will be discussed in greater detail below.

As the devices that perform data entry (cash registers, data terminals, optical character readers, radio frequency readers, magnetic media readers, gas pumps, ATMs, and many other like input devices. etc.) become more sophisticated, larger quantities of alphanumeric characters describing the transaction are generated. If video data is to be integrated with such transactional data, the increase in information makes it much more difficult to overlay transaction data on a composite video image, as is effected in some known video surveillance systems. Furthermore, the general increase in information available when integrating transactional and/or video information from disparate electronic systems results in the need for a more convenient, feasible and proactive solution to analyze such information without relying solely on user review of the vast amount of information.

SUMMARY OF THE INVENTION

Accordingly, the present invention is directed to a system and method for integrating and characterizing data from multiple electronic systems that substantially obviates one or more of the problems due to limitations and disadvantages of the related art.

Electronic systems that may potentially be integrated in accordance with the subject computer-based platform include but are not limited to various combinations of point of sale terminals, video recording systems, burglar/alarm systems, electronic article surveillance systems, access control systems, automatic teller machines, gas pumps, RFID detection systems, metal detector systems, and/or telemetry systems.

Embodiments of the presently disclosed technology may be utilized in a variety of applications and corresponding environments, including without limitation, security and safety, loss prevention, merchandizing and marketing, research of products, transactional environment, customer service effects, training, operations surveillance, etc.

It should be further appreciated that some embodiments of the present invention integrate and correlate transactional and/or video data streams from a plurality of electronic systems and package selected data into a plurality of independent data events. Such data events may then be proactively and automatically analyzed for certain patterns or occurrences. Notification of such identified data patterns or occurrences may then be relayed to a user via such protocols as a web-based or operating system-based user interface or e-mail notification.

Additional features and advantages of the invention will be set forth in the description which follows, and in part will be apparent from the description, or may be learned by practice of the invention. The objectives and other advantages of the invention will be realized and attained by the structure particularly pointed out in the written description and claims hereof as well as the appended drawings.

To achieve these and other advantages and in accordance with the aspects of the presently disclosed technology, as embodied and broadly described, a method of detecting and managing data events from a plurality of electronic systems, includes the exemplary steps of coupling each of a plurality of electronic systems to a central control system, receiving and interfacing at least one datastream from each of the plurality of electronic systems to yield a collection of assembled data, sorting and organizing the assembled data from the plurality of electronic systems to formulate a collection of discrete events, wherein the discrete events are independent from the assembled data and are relayed to a dedicated storage medium, comparing the formulated events to one or more predetermined event definitions, pro-actively identifying as exceptions when the formulated events meet or exceed the one or more predetermined event definitions, correlating supplemental time-synchronized data to selected of the identified exceptions, and providing notification to a user of the identified exceptions.

Another exemplary embodiment of the disclosed technology concerns a computer-based platform for integrating a plurality of electronic systems and correlating information outputs therefrom. The computer-based platform may be web-based in some exemplary embodiments or based on an operating system such as Microsoft® Windows® in other embodiments. Such a computer-based platform may include such exemplary elements as at least one interface module for establishing a connection between the computer-based platform and selected of the plurality of electronic systems and for obtaining data from said selected of the plurality of electronic systems, a user interface for creating and maintaining user-defined criteria for characterizing the data from the plurality of electronic systems and for defining one or more event types associated with the data received from the plurality of electronic systems, a data-processing procedure for transforming the data from the plurality of electronic systems into a common format, parsing the commonly formatted data collected from the plurality of electronic systems, and posting independent data events identified within the commonly formatted data to an associated storage medium, an exception manager for determining when events identified via the data-processing procedure meet or exceed a trigger definition, thus corresponding to an exception, and a notification engine for proactively relaying notification information regarding selected events and exceptions to a user.

It is to be understood that both the foregoing general description and the following detailed description are exemplary and explanatory and are intended to provide further explanation of the invention as claimed.

BRIEF DESCRIPTION OF THE DRAWING

The accompanying drawings, which are included to provide a further understanding of the invention and are incorporated in and constitute a part of this specification, illustrate embodiments of the invention and together with the description serve to explain the principles of the invention.

In the drawings:

FIG. 10 illustrates a screenshot of exemplary aspects of a user interface, including exception notification features according to one aspect of the present invention;

DETAILED DESCRIPTION OF THE ILLUSTRATED EMBODIMENTS

Reference will now be made in detail to an embodiment of the present invention, example of which is illustrated in the accompanying drawings.

The present invention integrates legacy electronic systems (e.g., POS terminals, CCTV video surveillance systems, EAS, fire alarms, telemetry systems, gas pumps, ATMs, etc.) from transactional and other environments and correlates information outputs from each of the legacy (i.e., pre-existing) electronic systems in a pro-active and meaningful way. Synergistic results stemming from the aforementioned integration include the ability to identify repetition of patterns of certain events that are indicative of fraud, theft, inadequate training, etc. and that warrant further investigation. Certain events or patterns of events may also be identified or analyzed to benefit such applications as product merchandizing, operations management, training needs, loss prevention, and security/safety/liability assessment. Non-inclusive exemplary transactional environments include grocery stores, convenience stores, mass merchandise stores, specialty stores, music stores, home improvement stores, pawn shops, banks, gas stations, airports and other related markets. Typical targets for video surveillance cameras include check out lanes, building entry and exit points, shopping aisles, customer services desks, specialty departments, etc. Some embodiments of the present invention combine transactional data and video data in one or more particular environments.

Figure 1:
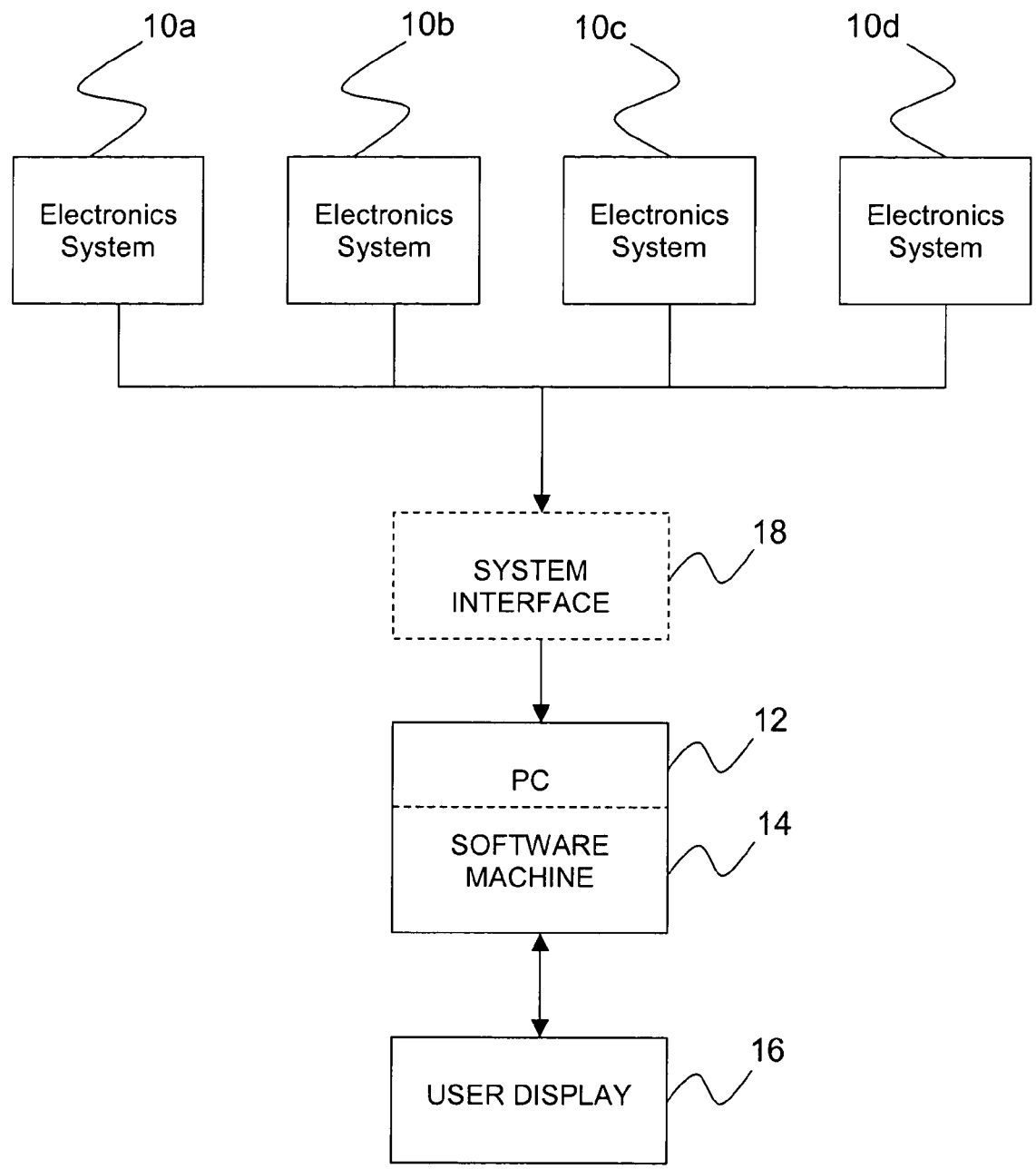
FIG. 1 is a schematic block diagram illustrating a general networked configuration of multiple electronic systems to a software machine on which a computer-based platform in accordance with aspects of the present invention may be utilized.

FIG. 1 illustrates a schematic block diagram of an exemplary configuration for integration of a plurality of electronic systems to a computer-based platform in accordance with aspects of the present invention.

Referring more particularly to FIG. 1, a plurality of legacy electronic systems 10*a*-10*d* (hereafter collectively referred to as systems 10) provide respective datastreams (e.g., transactional data and/or video datastreams). It should be appreciated that the number of electronic systems illustrated in FIG. 1 is illustrated merely for exemplary purposes, and often many more than four systems will be integrated in accordance with aspects of the presently disclosed technology. Such data is integrated and made useable together via a computer 12 (e.g., a standard personal computer, IBM, MacIntosh, etc.) supporting a software machine 14. The software machine 14 allows users to access the system of the present invention for configuration and operation via web-based or operating system-based software running on at least one user display 16.

Each legacy system 10 may correspond to a variety of different electronics systems, hereafter generally characterized as either transactional systems such as but not limited to point of sale (POS) terminals, electronic article surveillance (EAS) systems, automatic teller machines (ATMs), gas pumps, alarm systems, telemetry systems, radio frequency identification (RFID) detection systems, etc. or video systems such as but not limited to CCTV video surveillance systems. This general characterization between transactional systems and video systems is made due to the different nature of the transactional versus video datastreams provided by the two respective types of systems. The plurality of electronic systems 10 may correspond to multiple systems in a single location, such as respective transactional terminals, video systems and alarm systems for a given store or application environment. Alternatively, the plurality of electronic systems may correspond to multiple systems in different locations, such as respective alarm systems for several stores in a retail chain. It should be appreciated that the type and location of each electronic system 10 may vary, and thus different combinations of integrated systems are appreciated in accordance with the presently disclosed technology.

The method and medium by which manufacturers of various electronic systems, such as cash registers, POS terminals, ATM machines, gas pumps, and other transactional systems format, transmit, and store transactional data is extremely diverse. Some transactional systems immediately transmit the transaction data to a corresponding host/controller immediately after every transaction. Other transactional systems hold or buffer the information in an internal memory until a certain time or until a buffer reaches a time or space threshold before transmitting the transaction data to the corresponding host/controller. Transaction systems typically assemble and use data in a proprietary structure and format. Being capable of reading the data generated from one transaction system does not ensure the ability to read data from another transaction system. The present invention incorporates a flexible design accommodating open compatibility with a plurality of transaction and/or video systems and corresponding operational methodologies. Referring again to the exemplary embodiment illustrated in FIG. 1, the present embodiment recognizes, and makes useable, the many various types of electronic systems that exist within different application environments. In general, each electronic system 10 includes sensor inputs that provide state information back to a central control system (e.g., the software machine 14 running on the computer 12) and are capable of generating a programmed output. These control systems are generally equipped with means of wired or wireless communications and they are capable of visual or auditory enumeration and usually have programmable relay outputs. Accordingly, the software machine 14 may manage a network connection (e.g., Universal Serial Bus (USB), etc.) via a system interface 18 equipped with a plurality of programmable sensor inputs. Each of the plurality of programmable sensor inputs are, in turn, connected to relay outputs of the aforementioned electronic systems 10a, 10b, 10c, 10d, . . . Although system interface 18 is depicted as a distinct and separate module, it should be appreciated that additional features for interfacing transactional and/or video datastreams may be included in the software machine 14. Exemplary interfacing features will be presented later in further detail.

Figure 2:
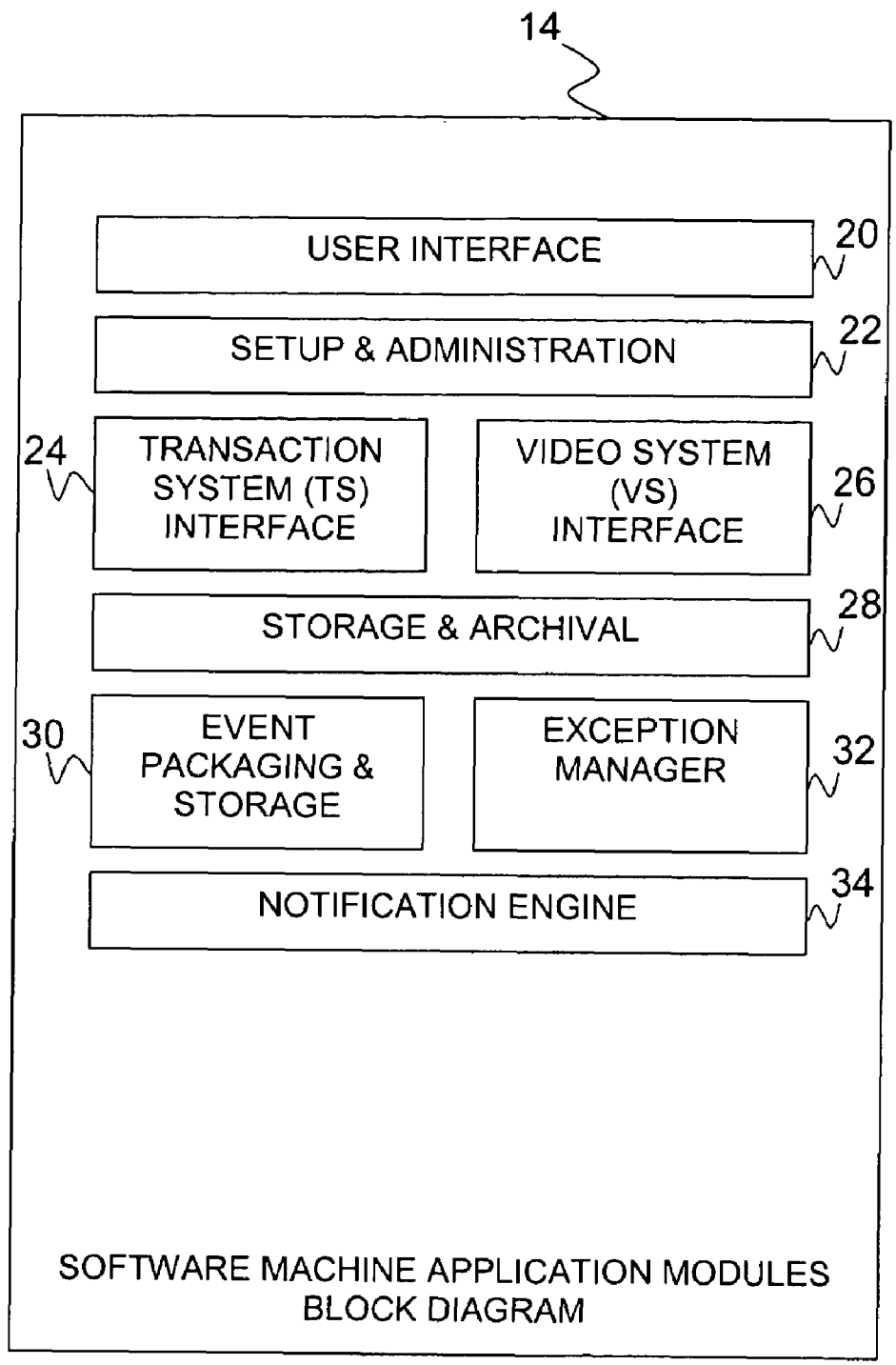
FIG. 2 is a schematic block diagram that identifies the various components comprising the software machine referenced in FIG. 1.

Referring now to FIG. 2, a schematic block diagram is illustrated identifying the various components of the software machine 14. The software machine may be constructed as an application running in host mode that includes a user interface 20, a setup and administration module 22, a transaction system (TS) interface 24, a video system (VS) interface 26, storage and archival engine 28, an event packaging and storage module 30, an exception manager 32, and a notification engine 34. Additional details of each modular aspect of software machine 14 will be presented later in further detail.

Figure 3:
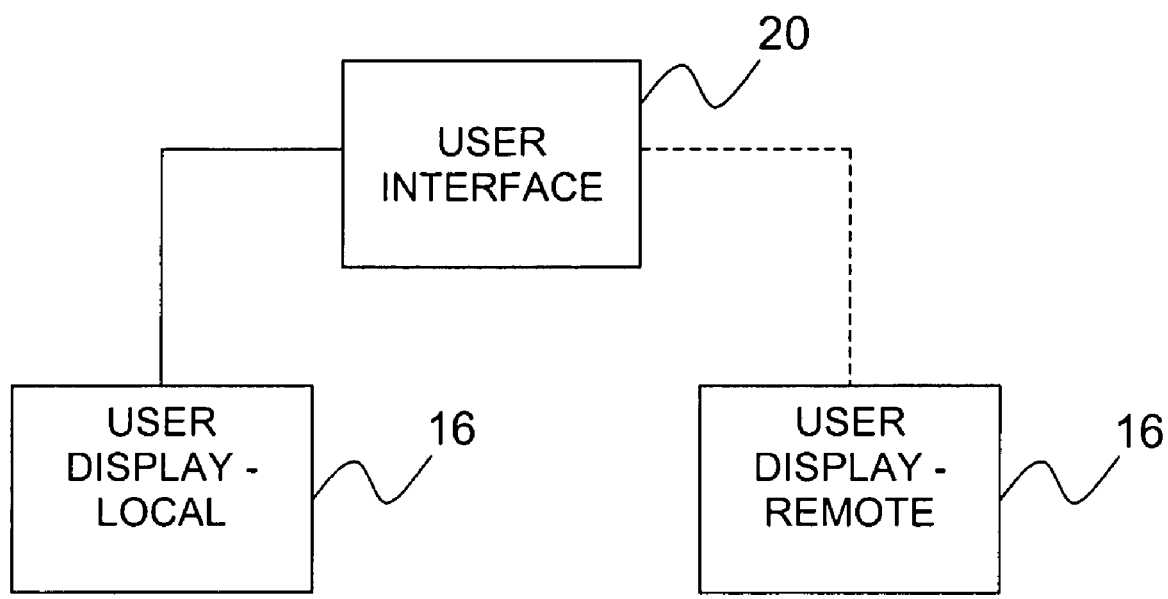
FIG. 3 is a schematic block diagram of an exemplary user interface portion of the software machine referenced in FIG. 2.

FIG. 3 illustrates a schematic block diagram of the user interface portion 20 of the software machine 14 and its relationship with the user display(s) 16. The user interface 20 may be provided, for example, as a web browser client running on the computer 12 connected to the user display 16 of the present invention via appropriate network connections (e.g., local or remote). The provision of user interface 20 as a computer-based platform, and more particularly as a web-based platform via, for example the Internet, a local area network (LAN) or other integrated computer network, facilitates diversity in system design and potential application environments. Although offering advantages for certain applications, it should be appreciated that aspects of the present invention should not be limited to operation as or in conjunction with a web-based platform. In still further embodiments of the present invention, the user interface may be Microsoft® Windows®-based or based on another suitable operating system.

Figure 4:
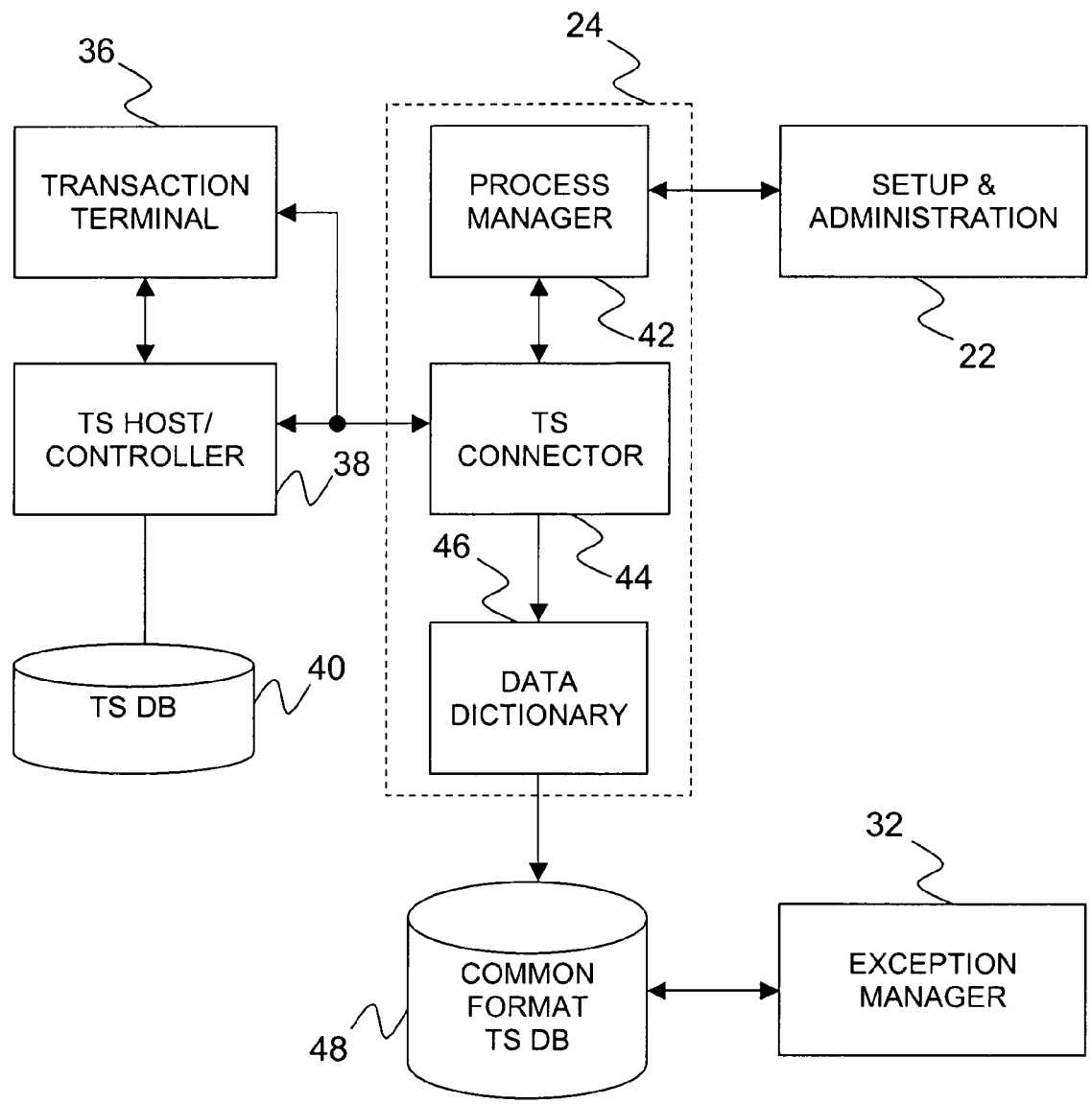
FIG. 4 is a schematic block diagram of an exemplary transaction system interface portion of the software machine referenced in FIG. 2.

With reference to FIG. 4, the transactional system (TS) interface 24 of the software machine 14 will now be discussed in greater detail. As previously mentioned, this interface may be used singularly or in combination with a remote system interface 18 to correlate transactional data received from such transactional systems as point of sale (POS) terminals, electronic article surveillance (EAS) systems, automatic teller machines (ATMs), gas pumps, alarm systems, telemetry systems, radio frequency identification (RFID) detection systems.

Referring now to FIG. 4, transactional data from a transaction system (TS) in accordance with the present subject matter is typically generated at a transaction terminal 36. For point of sale systems, transaction terminal 36 may correspond for example to a cash register or product scanner. For alarm system applications, transaction terminal 36 may correspond to a particular alarm trigger location within a network of trigger locations in one or more given areas. Alarm triggers may correspond, for example, to contact closure on a relay because a fire or burglar was detected. For electronic article surveillance systems, transaction terminal 36 may correspond to RFID detection devices located at one or more store entrances or other predetermined locations. By way of example, transaction terminal 36 could also correspond to an ATM or gas pump payment module, or any other specific system for effecting a "transactional" event which can be recorded in a data format. Transactional data indicative of the transactions (which are often sales related) is stored in an internal memory (not shown) of the transaction terminal 36 before it is transmitted to a TS host/controller 38. Transmission of the transactional data may be either a batch process or a real-time process. The TS host/controller 38 then stores the transactional data in transaction system database (TS DB) 40 for future use.

Referring still to FIG. 4, The TS interface 24 within the software machine 14 may be generally treated as a switched virtual connection (SVC) that operates as a background service running on the computer 12 and includes a process manager 42 that oversees the operations of the TS interface portion of the software machine 14, a TS connector 44 that acts as the primary means of acquiring transactional data from the TS DB 40 by managing a network connection with the TS host/controller 38, a data dictionary 46 that converts relevant transactional data into a common format, and a common transaction database 48 for storing the relevant transaction data.

More specifically, as directed by the process manager 42, the TS connector 44 acquires transactional data from the TS DB 40 via one of three methods: (1) accessing a transaction log file on the TS host/controller 38; (2) establishing a direct connection with the TS DB 40 via TS host/controller 38; (3) establishing a socket level connection with the TS host/controller 38 via a predetermined Internet protocol, or (4) real-time network traffic monitoring from transaction terminals. The TS connector 44 may locally or remotely interface with the transaction system (i.e., the transaction terminal(s) 36, the TS host/controller 38, and the TS DB 40) via the TS host/controller 38 according to programmed time intervals or as directed by a user to acquire data from the transaction system. In response to a query from the TS connector 44, the TS host/controller 38 broadcasts transactional data within the transaction system over the socket to a receiving program managed by the TS connector 44. Data formats of disparate transaction terminals are typically different from one another. Accordingly, once the transactional data is acquired from a particular transaction system, the raw transactional data is written to a local file (not shown) on the computer 12 and is processed through a data dictionary 46 where it is converted into a common format (e.g., XML) useable by process modules within the software machine 14, as will be described in greater detail below. The data dictionary 46 is essentially a conversion reference that maps transaction data from one format to another. To accomplish this format translation, a unique map is constructed for each disparate data format. These unique maps are initiated and maintained via the setup and administration module 22 through the user interface 20, as will be discussed in greater detail with reference to FIG. 11. Once conversion to the common format is complete, the integrity of the commonly formatted (e.g., XML) transaction data is validated and checked for errors. The commonly formatted transaction data is then qualified against programmable criteria, specified via the user interface 20, to determine whether the data corresponds to an event. The qualified transaction data is then written to a common format transaction database 48, located in the storage and archival portion 28 of the software machine 14, for future use by an event packaging and storage engine 30 and an exception manager 32 also located in the software machine 14, as will be discussed in greater detail below.

Figure 5:
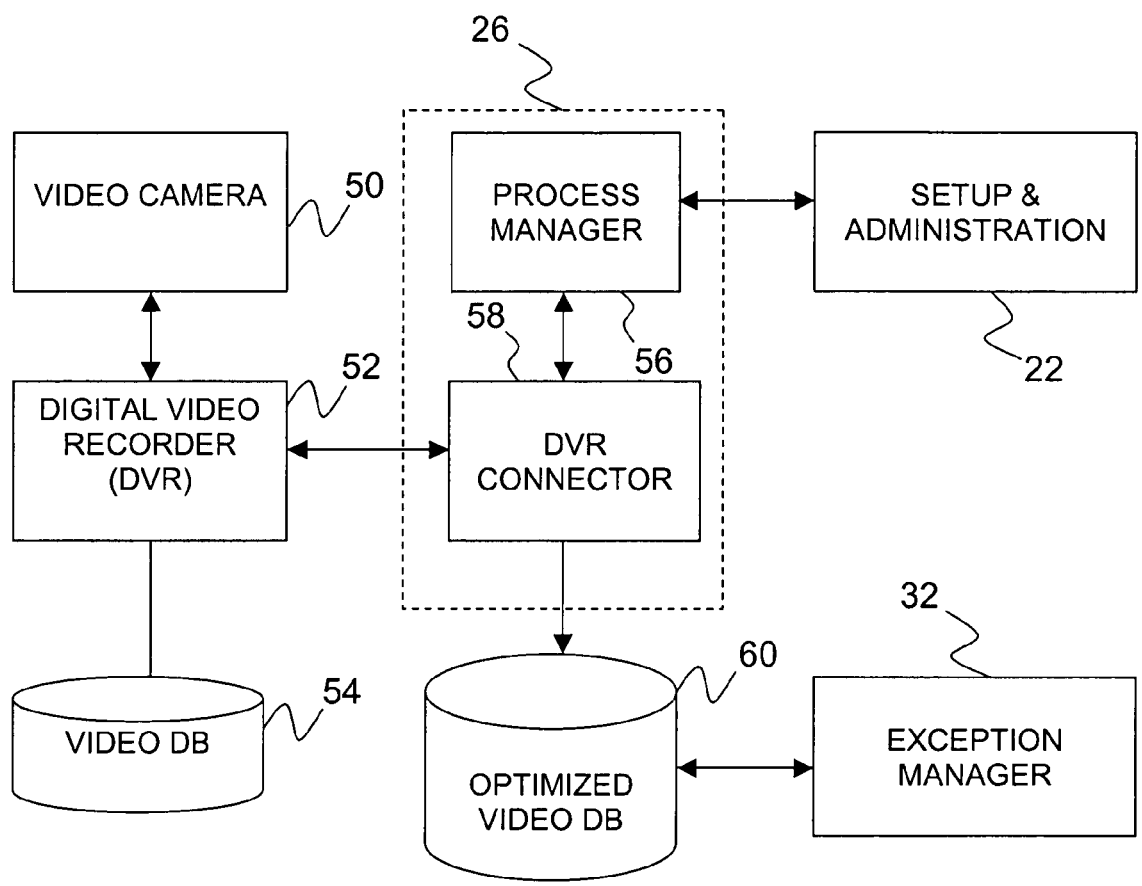
FIG. 5 is a schematic block diagram of an exemplary video system interface portion of the software machine referenced in FIG. 2.

With reference now to FIG. 5, the video system (VS) interface 26 of the software machine 14 will now be discussed in greater detail. Video cameras 50 (e.g., CCTV surveillance cameras, etc.), in one aspect of the invention, may generally include a plurality of video cameras pointed at various targets within a retail environment and provide a central vantage point of viewing elements within such retail environment (e.g., employees, registers, doors, consumers, merchandise, etc.). Since the presently disclosed technology is not limited to retail environments, other video system embodiments may correspond to video cameras pointed at other corresponding transactional terminals such as an ATM machine, airport gate, gas pump, store entrance/exit, etc. It will often be the case that the subject computer-based platform will receive both transactional data and video data for the same location, such as a given transaction terminal.

Conventionally, analog video signals generated by video cameras are received by a multiplexing device and are further recorded on magnetic tape using a Video Cassette Recorder (VCR). In accordance with one aspect of the present invention, analog video signals generated by the video cameras 50 of FIG. 5 are received by analog to digital conversion technology for recording digital video data on digital media (e.g., magnetic hard drive, etc.) using a digital video recorder 52. A digital version of the video generated by the video camera 50 in the video system is stored in a video database 54. In accordance with an alternate aspect of the present invention, digital video signals generated by the video cameras 50 may be received directly into the digital video recorder 52.

Products that convert analog video signals to digital media are widely available. Digital video recording technology offers many advantages over conventional recording methods. Digital Video Recorder (DVR) systems may include computers equipped with specialized encoding equipment to produce and store digital video segments. As digital video signals are produced and stored within digital recording media (e.g., hard disk, etc.), corresponding timestamp information is also stored in a separate reference database. Additionally, correlated source information is stored with the timestamp information so that users of the system in the present invention can determine which video segment was generated by which video camera.

The present invention incorporates a flexible design accommodating open compatibility with pre-existing disparate DVR systems and operational methodologies. The VS interface portion 26 of the software machine 14 generally includes a DVR process manager 56, operating in a similar fashion as the transaction process manager 42 in the TS interface 24, which oversees the operations of the VS interface 26, a DVR connector 58 that acts as the primary means of acquiring digital video data from the video database 54 by managing a network connection with the DVR 52, and an optimized video database 60 for storing predetermined time segments of digital video, as will be discussed in greater detail below.

More specifically, as directed by the DVR process manager 56, the DVR connector 58 manages a network connection (e.g., TCP/IP via Ethernet LAN topology) with the DVR 52 to acquire the predetermined time slices of digital video from the video database via one of two methods: (1) establishing a direct connection to the database and file systems of the DVR 52; or (2) establishing programmatic requests to a software application running on the DVR 52. The DVR connector 58 maintains configuration files corresponding to either of the aforementioned video data acquisition methods and facilitates the interface and digital video data acquisition. According to the principles of the present invention, only a small subset of the video data stored on the DVR systems is utilized at any given time. Video segments of predetermined length from a specific camera source are pulled from the video database 54 and stored in the optimized video database 60, located in the storage and archival portion 28 (See FIG. 3) of the software machine 14, for future use by the exception manager portion 32, as will be discussed in greater detail below.

Referring again to more general aspects of the presently disclosed technology, transaction data from the TS DB 40 and digital video images from the video database 54 are integrated and made useable together via a computer 12 (e.g., a standard personal computer, IBM, Macintosh, etc.) supporting a software machine 14. The software machine 14 manages network connections (e.g., TCP/IP via Ethernet LAN topology, etc.) with the TS host/controller 38 and the digital video recorder 52 to acquire respective datastreams of transactional data and digital video data. It should be appreciated that some embodiments of the invention may correspond to only data received from video systems or only to transaction data without any corresponding video data. The software machine 14 allows users to access the system of the present invention for configuration and operation via, for example, web-based and/or Microsoft® Windows®-based software running on at least one user display 16. In one aspect of the present invention, the software machine 14 has the capability to support either a single or many user displays via local network connection (e.g., TCP/IP via Ethernet LAN topology) or remote network connection (e.g., TCP/IP Internet, Intranet, Extranet, VPN, Dial connection, wireless or PDA).

Figure 6:
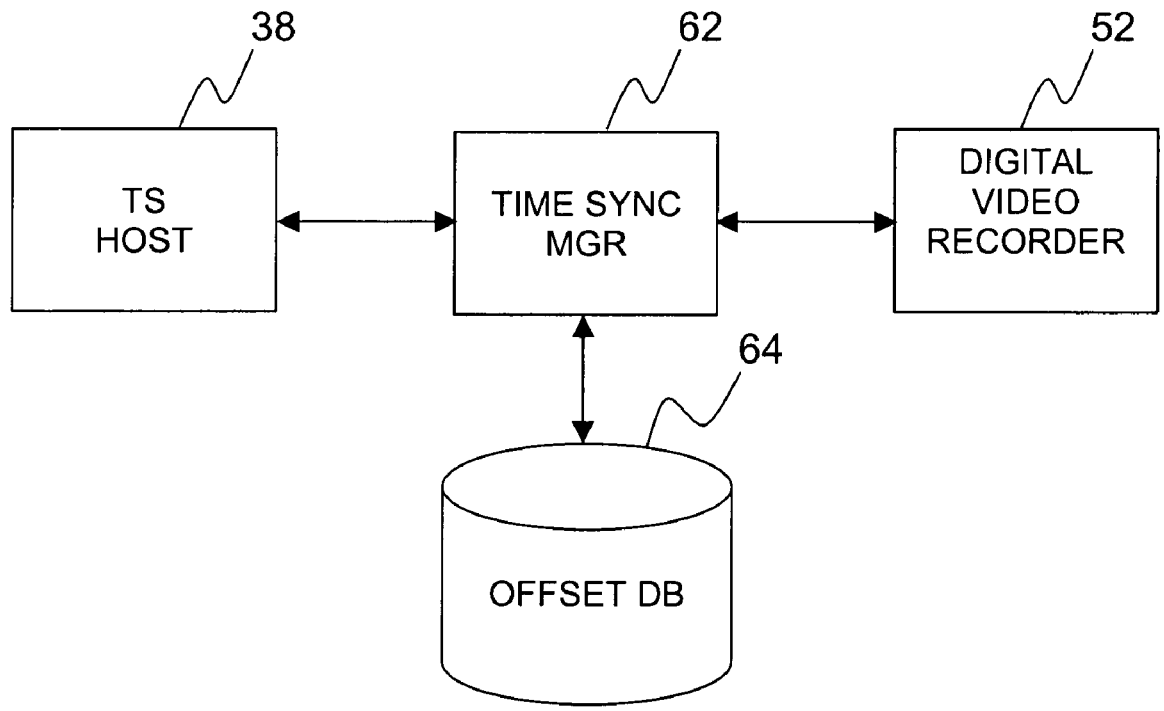
FIG. 6 is a schematic block diagram of an exemplary time synchronization manager for use in some exemplary embodiments of the present invention.

Referring now to FIG. 6, a schematic block diagram of a time synchronization manager is illustrated. Such a time synchronization manager may be utilized to correlate when needed transactional and video data directed to a single location (e.g., register data and video footage of such corresponding register). Such time synchronization manager is not limited to such direct correlation of video and transactional data, and may be utilized to synchronize data from any number and type of electronic systems.

One aspect generally realized by the principles of the present invention includes the capability to integrate disparate systems typically operating by their own time sources. For example, TS host/controller 38, DVR 52, and the remote system interface device 18 components within a transactional environment typically operate according to their own internally provided time source. The present invention provides the ability to accurately relate any required time signatures of a selected time segment of digital video with a time signature of a transactional event and/or state change event. In some cases, the act of relating of the time signatures further occurs after the transactional and/or state change event transpires. Accordingly, the present invention uses an offset approach to correlate time signatures of disparate systems within a transactional environment.

Specifically, and as described with reference to FIG. 6, the time synchronization manager 62 located on the computer 12 records a time signature from each interfaced TS host/controller 38 as well as from each DVR 52 in any interfaced video system. Time synchronization manager 62 may also record a time signature from the remote system interface device 18 if desirable (not shown). The time synchronization manager 62 then records the time signatures from each system, along with a corresponding offset time from its own internal time source in the offset time database 64. Accordingly, a baseline time stamp maintained within the offset time database can be used to correlate the disparate systems within the transactional environment. In an exemplary aspect of the present invention, an offset time entry may be recorded every one minute, wherein a temporal resolution down to the second is available. Using the aforementioned offset time synchronization manager, any requirement for time correlated video and/or transaction data may be fulfilled within a reasonable degree of accuracy. The time source within the time synchronization manager 62 may be set, for example, by requesting the official time from the Naval Observatory via dial up or Internet connection on periodic intervals established by the users of the system via the user interface 20.

In an alternate exemplary aspect of the present invention, the synchronization of time signatures from the various aforementioned components within the transactional environment (e.g., each TS host/controller 38, DVR 52, computer 12) may alternatively be correlated without the use of a time synchronization manager 62 or an offset time database 64. Accordingly, in this alternative aspect of the present invention, correlation of time signatures from disparate systems may be accomplished by appreciating the fact that all of the components, including the computer 12, within the application environment except a TS host/controller 38 may be provided to operate according to what is known in the art as Simple Network Time Protocol (SNTP). In order to correlate the time signature between the aforementioned components and a given TS host/controller 38, a socket connection between the computer 12 and the given TS host/controller 38 is established where the time signature of the given TS host/controller 38 is broadcast to the computer 12. The computer 12, operating with a time source based on SNTP, then uses the broadcasted time signature as a basis for setting its own time source and, in turn, broadcasts the time signature of the given TS host/controller 38 to the remaining components within the application environment so that the remaining components may then alter their time signatures to correspond to the given TS host/controller time signature. Thus, regardless of the time or type of the given TS host/controller communicating with the software machine 14 on the computer 12, the time signature from the TS host/controller determines the time signatures of the components within the application environment. Accordingly, the need for a specialized time database or external verification of standard times is removed, allowing for a robust ability to synchronize the time signatures of disparate components within a transactional environment.

Figure 7:
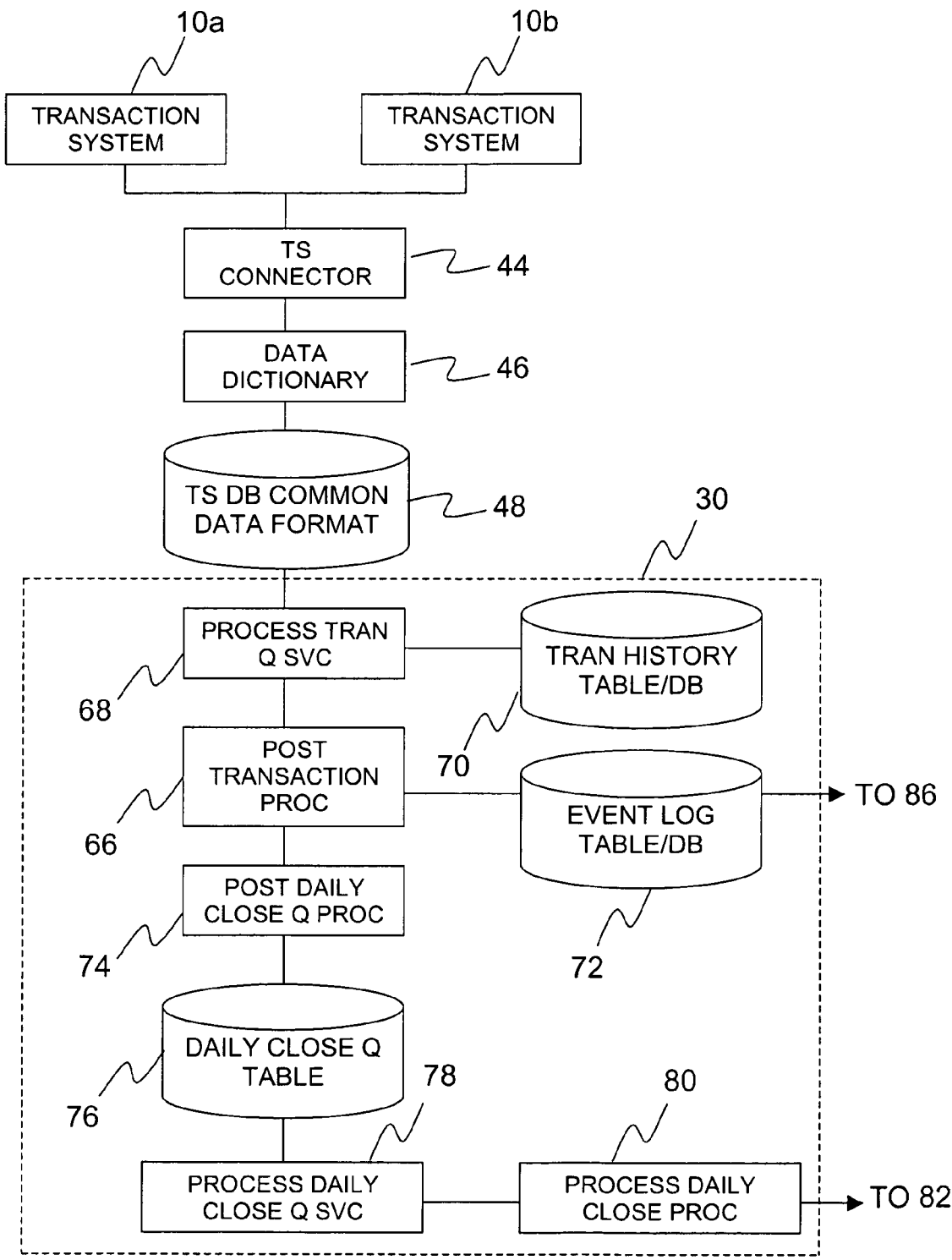
FIG. 7 illustrates a schematic block diagram of an exemplary event packaging and storage portion of the software machine referenced in FIG. 2 and its relationship to the TS interface also referenced in FIG. 2.

Referring now to FIG. 7, a block diagram of the logic components within the event packaging and storage module 30 of the software machine 14 and its relationship with the transaction system interface portion 24 of the software machine including common format TS transaction database 48 are illustrated.

As used in the present disclosure an "event" is characterized according to an event definition. An event definition describes a particular behavior or occurrence that meets specific, user defined criteria created and maintained via the user interface 20. In one aspect of the invention, events may be data related to POS transactions (e.g., a manual override at register, a transaction void, a hand-keyed credit card, hand keyed gift card, price check scan, check over amount, no receipt return, multiple line scan items, etc.). In other aspects of the invention, an event may correspond to an alarm system activation, an ATM transaction or invalid attempt to access an account (for example, via entering the wrong PIN number), an RFID sensor detection, etc. Event definitions may be stored in an event definition database provided within the setup and administration portion 22 of the software machine 14, as will be discussed in greater detail below.

Event definitions will often vary depending on the specific application environment in which the presently disclosed technology is utilized. Some exemplary applications of the subject data integration platform include merchandizing, retail operations, employee training, loss prevention, security, safety, and liability.

In accordance with product merchandizing applications, transactional data can be transformed into events that define aspects related to both the products being sold and the customers that purchase such products. When a sale transaction occurs at a transaction terminal, a product ID number or other specific identification variable is typically gathered for each item purchased. Based on video data or other means for determining customer information also gathered at such respective transaction terminals, general customer information such as age, sex, race, etc. may be used to map product purchases to customer demographic information. Interpolation and analysis of such sales information can provide a retailer with valuable information from a marketing perspective. Product identification information can also be combined with product location information to define an event in accordance with the present subject matter and subsequently provide data for analyzing specific sales activity. For example, determination of products sold from within various specific retail departments or at locations targeted for high levels of visual display, such as at an aisle endcap location, may be desirable from a merchandizing perspective. Yet another application of merchandizing information would be to define events according to when a customer purchases specific combinations of products. For example, if it is determined that a relatively large number of customers who purchase item A also purchase item B, then it may be advantageous from a marketing perspective to position items A and B relative to one another from a product location perspective in attempt to increase subsequent joint sales of items A and B.

Events in accordance with the present subject matter can also be defined for retail operations applications. For instance, video data can be interpolated to provide line counts at given point of sale terminals in order to determine from an operational perspective if registers are properly staffed at different times during business hours. Video data from within a store or of exterior locations such as parking lots may be analyzed to determine, for example, if carts are scattered or gathered in designated collection areas, if stockrooms are stocked appropriately to avoid such potential instances for safety hazards, or if only authorized employees are utilizing a breakroom or other facility. Data may also be collected to define specific aspects of customer traffic patterns, such as the number of people that pass by a certain area within a retail or other environment (e.g., number of people that walk down a particular store aisle, number of people that use a given ATM or gas pump). Transactional events can be defined not only from the perspective of transaction between the retailer and a customer, but also between a retailer and its supplier. As such, transactional events may be analyzed by a retailer to ensure accuracy of direct store receiving and other aspects of shipping and/or receiving from a supplier.

Still further aspects of the subject technology may relate to employee training applications. Video data can be analyzed to ensure specific employee presence, such as a constant presence at a customer service desk in a retail environment. Transaction data can be analyzed to determine scan-gap data (i.e., the time between successive scans) at a given register. Triggers can be set to define event exceptions when one or more scan-gaps exceeds a predetermined time limit. This type of analysis may be particularly beneficial from efficiency and customer satisfaction perspectives. Transactional and/or video data can be further utilized in an exemplary training application to monitor employee register activity (e.g., configuring data events for first timed portion of an employee's shift or during register closeout). Such event data can be particularly beneficial in training applications for new employees.

Yet another example of event definitions in accordance with the present subject matter regards applications of security, safety, and liability. Video and/or transactional data can define events, for example, when an alarm system is tripped video data can be correlated at the alarm transaction time to help determine the cause of alarm activation. Video and/or transactional data can also be correlated for identity security purposes, such as tying video data to an ATM transaction when a person uses an incorrect PIN number two or more times or upon occurrence of one or more alternative business rules as defined by a financial institution. Security applications in such an environment as an airport or similar establishment can employ event definitions when people activate a metal detector, or enter a restricted area, a specific flight gate, or other defined area. Integrated data can be defined from a liability perspective to provide information to support or invalidate claims of slip and fall type injuries in a retail environment or also to address product limitations concerns such as on sales of tobacco, alcohol or other products.

Referring again to FIG. 7, to determine what portions of the transaction data within the common format transaction database 48 correspond to any "event", a post transaction procedure 66 is used. The post transaction procedure is activated by a process transaction queue SVC 68 that runs as a background service on the computer 12, within the event packaging and storage module 30. The process transaction queue SVC 68 runs according to programmed time intervals or as directed by a user. The post transaction processor parses the commonly formatted transaction data, posts transaction event types found within the commonly formatted transaction data, and chronologically organizes the occurrence of events according to values of a predetermined temporal structure (e.g., month, day, year, hour, minute, second, shift schedules, etc. or combinations thereof). In one aspect of the present invention, the post transaction procedure 66 writes the parsed, posted, and organized data to a transaction history database 70, located within the storage and archival portion 28 of the software machine, for future analysis. In another aspect of the present invention, the post transaction procedure writes transaction events from the parsed, posted, and organized data as discrete events to a transaction event log table 72 for subsequent analysis by a trigger process module in the exception manager portion 32 of software machine 14, as will be discussed in greater detail below. Entries in the transaction event log table 72 include key identifying information about the transaction or situation in which the event occurred. For example, identifying information pertaining to a transaction event at a transaction terminal may include an event descriptor, transaction number, date/time stamp, operator ID, terminal ID, sale amount, tender type, and/or tender amount. Upon encountering a change in the value of the predetermined temporal structure within the commonly formatted transaction data, the post transaction procedure 66 initiates a period processing by calling a post period close queue procedure 74. The post period close queue procedure 74 writes transaction data for open periods, which need to be processed, to a period close table 76. Subsequently, a period close queue SVC 78, running as a background service on the computer 12, according to either a programmable time interval or as directed by a user, calls a process period close procedure 80. The process period close procedure is a stored procedure that generates entries for period processing into a trigger queue table, within the trigger process module of exception manager 32, as will be discussed in greater detail below.

Referring now to the exception manager portion 32 of software machine 14, it is noted that the exception manager 32 conceptually includes respective trigger and exception core process modules.

As used in the present disclosure, the term "trigger" is characterized as a set of user defined parameters related to an event. Each trigger may be further characterized by a definition created and maintained by the user through the user interface 20. Each trigger definition may include components relating to period, group-by parameters, priority based on criticality of event, and/or quantity-threshold. As described above, a purpose of some exemplary trigger definitions is directed to identify abnormal repetition or patterns of certain events that are indicative of fraud, theft, or inadequate training and that warrant investigation. Accordingly, a trigger definition may include user definable boundaries relating to events indicative of fraud, theft, etc., such as a threshold for a predetermined number of events occurring within a predetermined temporal period (e.g., a day). Other user-definable boundaries may be set in the trigger definition to achieve granular results of pattern analysis. For example, triggers for a transaction event in a retail environment may be defined as follows: all returns with a tender amount over $200 or more than 12 occurrences of a transaction void by the same operator within a 24 hour period. In the first example above, the threshold was "all" and the POS event was "tender amount over $200". In the second example above the threshold was "12" and the POS event was "transaction void" further qualified by "the same operator". Trigger definitions may be stored in a trigger definition database provided within the setup and administration portion 22 of the software machine 14, as will be discussed in greater detail below.

In the present invention, each trigger entry (provided by the user via the user interface 20) within the trigger queue table 82 may be processed against the entries within the event log table 72. To accomplish this, a process trigger queue SVC 84, running as a background service on the computer 12, calls a process trigger procedure 86 either according to predetermined time intervals or as directed by a user. The process trigger procedure then processes entries within the trigger queue table 82 against entries within the event log table 72 (see FIG. 7). For each instance where criteria within a particular trigger definition is satisfied, a corresponding record is written to a trigger history table 88, located within the storage and archival portion 28 of the software machine, for future analysis. When the trigger thresholds are exceeded, events corresponding to the exceeded thresholds are written to an exception queue table 90 for further processing within the exception process module, as will be discussed in greater detail below.

As used in the present disclosure, an event is an "exception" when criteria within a trigger definition has been met or exceeded. The term "exception" is used herein to refer to a database record containing references to the one or many events that satisfy a corresponding trigger definition. A process exception queue SVC 92, running as a background service on the computer 12, calls a process exception procedure 94 and makes exception entries into a notification queue table 96 according to predetermined time intervals or as directed by a user. Additionally, the process exception procedure makes entries of exceptions into the exception log table 98, located within the storage and archival portion 28 of the software machine, for archival reference and into an image queue table (not shown). Entries made into the image queue table may then be processed according to one or more instructions set forth within parameters defined by an exception definition (e.g., video pull instructions and notification instructions). Further, exception definitions may be specified by the user via the user interface 20.

Video pull instructions direct the DVR connector 58 to pull a predetermined time segment of video from the video database 54 for each event referenced by the exception where it is then stored in an optimized video database 60, thereby allowing users to associate a video with transaction activity.

Figure 8:
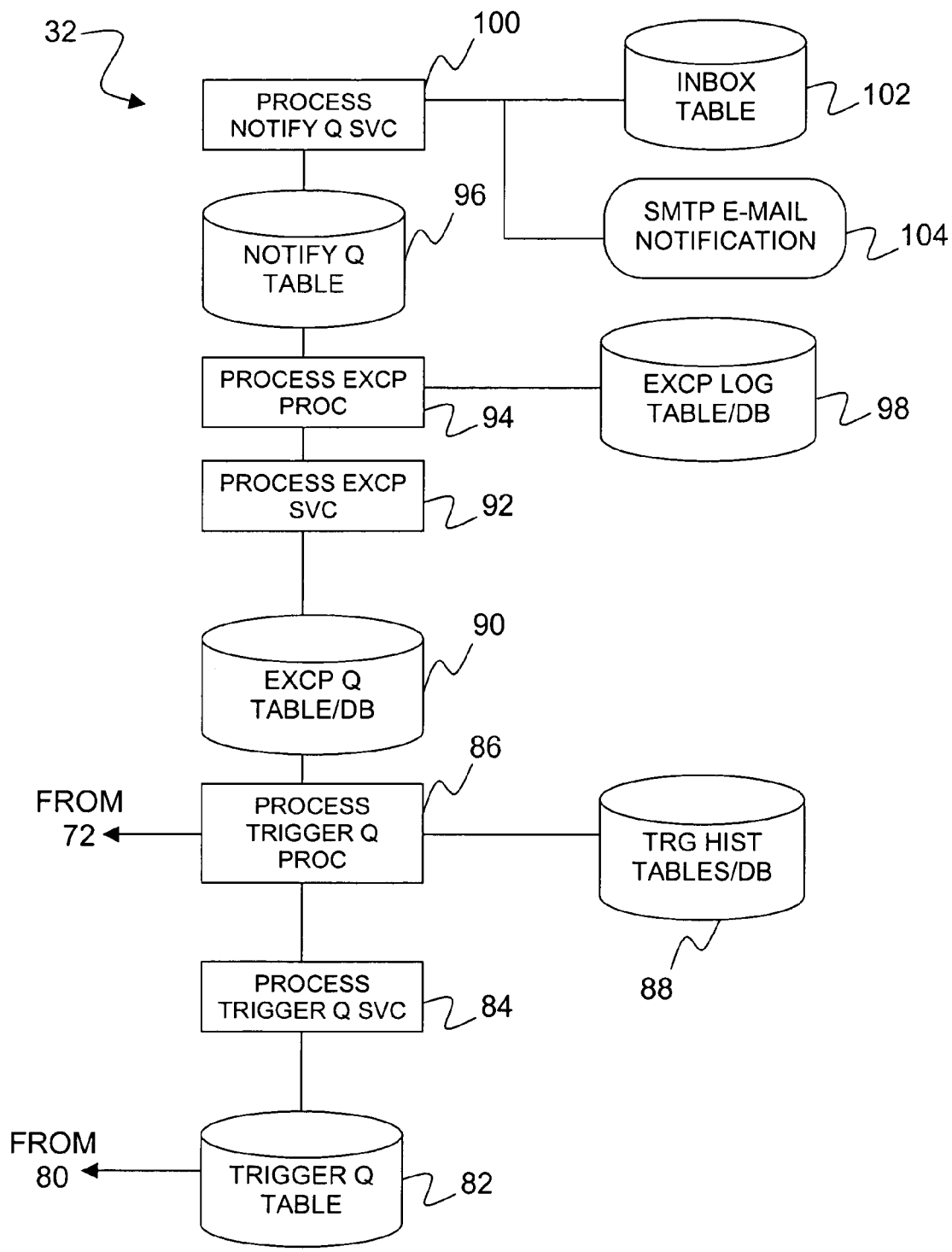
FIG. 8 illustrates a schematic block diagram of an exemplary exception manager portion of the software machine referenced in FIG. 2, and its relationship to the notification engine also referenced in FIG. 2 as well as the event packaging and storage portion depicted in FIG. 7.

Still referring to FIG. 8, notification instructions direct the process notify queue SVC 100, running as a background service on the computer 12 and according to programmable intervals or as otherwise directed by a user, to process entries from the notify queue table 96. Further, according to the notification instructions, the process notify queue SVC 100 notifies users that an exception has been detected by making entries in an inbox table 102 and/or sending email notification via a standard SMTP service 104. Notification instructions may direct the delivery of exception notifications to individuals or groups of individuals based on components of the trigger definitions. Notification instructions may be provided within a notification setup module within the setup and administration portion 22 of the software machine 14, as will be discussed in greater detail below. The results of this entire process are delivered to the user proactively (not requiring a manual query).

Figure 9:
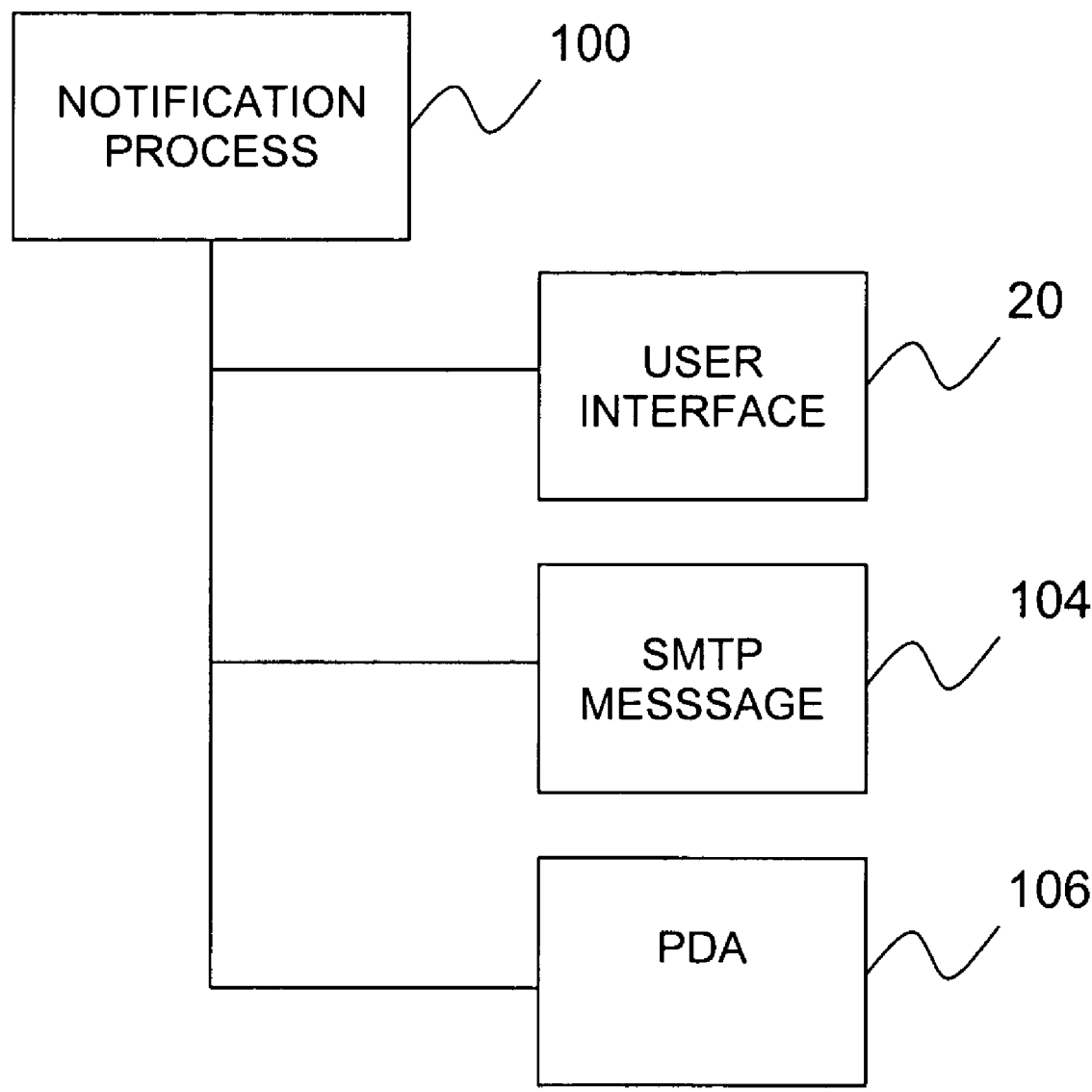
FIG. 9 is a schematic block diagram of an exemplary notification engine portion of the software machine referenced in FIG. 2.

More specifically, notification instructions are processed within the notification engine 34 of the software machine 14. Notification of exceptions may be provided through many methods. For example, referring now to FIG. 9, notification may be provided visually through the user interface 20, may be sent electronically via an external delivery mechanism (e.g., an SMTP message 104, email) to predetermined users of the system, or may be sent to a Personal Digital Assistant (PDA) 106 through a standard wired or wireless interface. The contents of such notifications may incorporate a means to link an external user back to the system if a proper network connection is made available.

As shown in FIG. 10, an "exception" may be viewed on a web-based browser interface or an operating system interface and contain information on an employee involved in the event, the type of event itself, the date, time, location the event took place, an exception reference ID, and appropriate links to view video images correlated with the event in the exception. The specific screenshot depicted in FIG. 10 is presented merely as an example of the type of information that might be available via a user interface 20 in accordance with the present subject matter as utilized in a retail environment utilizing point of sale terminals. A significant amount of design versatility is afforded to the specific amount and type of information provided to a user via exception notification tools.

With more particular reference to the exemplary exception notification interface of FIG. 10, an Exception Header portion 1 may include such exemplary information as the type of exception, the corresponding event type or definition, the trigger threshold that was exceeded, the exception detection date, and the employee corresponding to the given exception. A segmented event display 2 may include such items as event date and time and identifying information for the transaction terminal (e.g., register), as well as links to the various aspects of the notification tool (i.e., overview, notes, and video). An event detail section 3 may include key information from the transaction. A transaction data section 4 may include an actual view of the transaction system data for the entire transaction. A link 5 to supplemental notes and/or remarks for the employee may be provided. Section 6 may provides a timeslice of digital video correlated to the specific event. Buttons 7 may be provided to mark an event as "Reviewed" or to return to other links. Section 8 may provide a user-customized heading such as a company logo, user name, date, and links to help and logout of the exception notification interface.

Still further aspects of the subject computer-based platform may be utilized by a user, especially a user on the executive or management level, to combine multiple selected transactions, events, exceptions, notes, research and/or other information to create larger groupings, or collections of assembled information. Such larger groupings of information can be derived from similar or diverse input systems and can be treated as a new entity and acted on independently. The larger groupings of information might be particularly useful when new issues arise regarding operations, merchandizing, transaction-based concerns or other occurrences. For example, a collection of events or transactions that was not previously characterized to trigger an event exception may be collected into a grouping for relay to other individuals or for further analysis to determine, for example, if it would be desirable to create new event and/or exception definitions for a given platform application.

Figure 11:
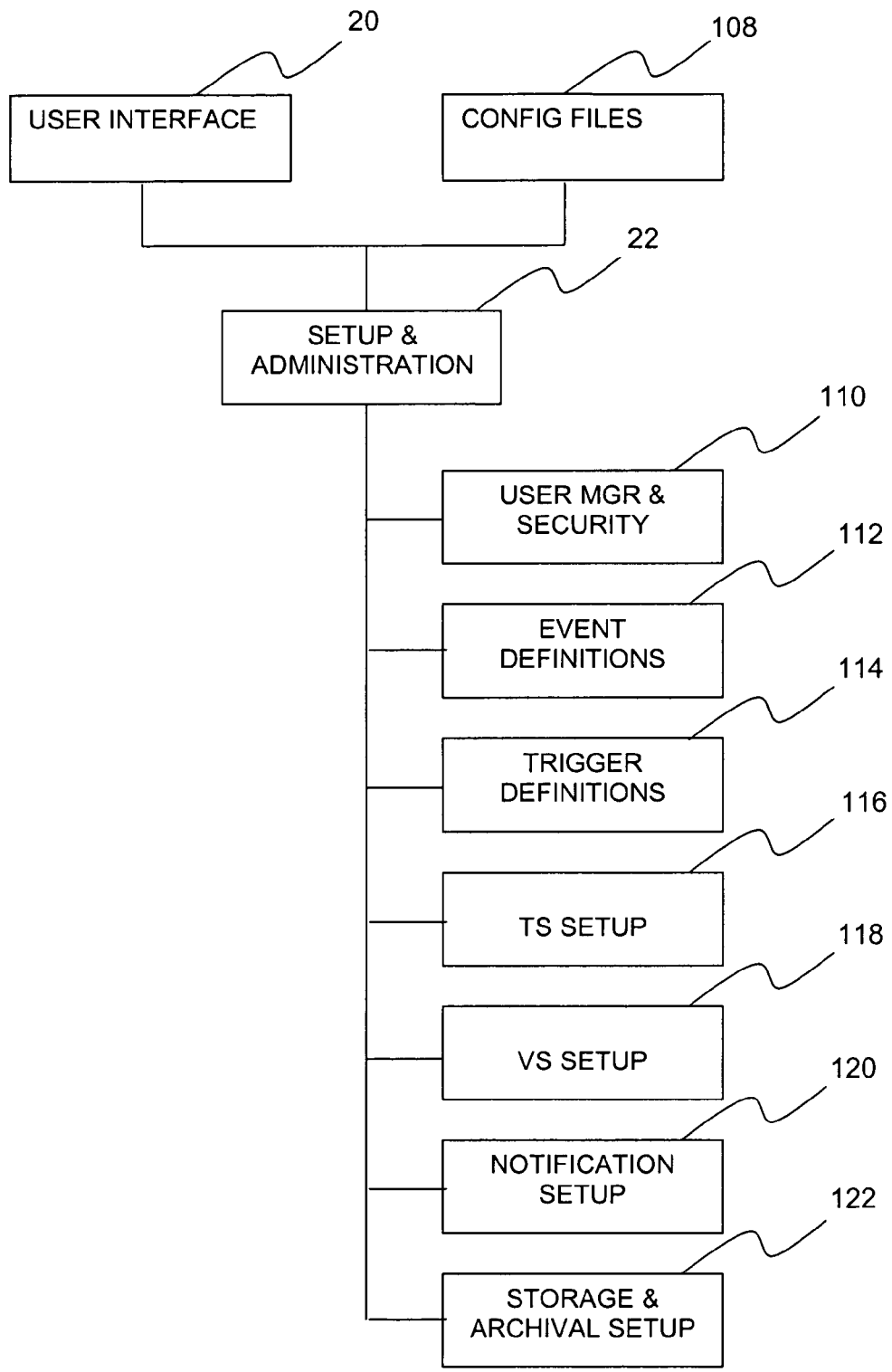
FIG. 11 is a schematic block diagram of an exemplary setup and maintenance portion of the software machine referenced in FIG. 2.

FIG. 11 illustrates a schematic block diagram of the setup and administration portion 22 of the software machine 14 referenced in FIG. 2.

The system and method of the present invention requires the setup and administration of many parameters for proper configuration and operation. These parameters are stored in database tables and/or configuration files 108 on a local or remote storage media (e.g., a hard drive) supporting the monitoring system. Access to configuration files is achieved via a standard operating system user interface while access to the database tables is achieved via user interface 20. The collection of database tables and configuration files used to store setup and operating parameters include user manager and security module 110, event definition database 112, trigger definition database 114, TS setup module 116, VS setup module 118, notification setup 120, and storage and archival module setup 122, all herein generically referred to as "application data".

The user manager and security module 110 is designed to scale both horizontally and vertically to accommodate distinct chains of access authority within the transactional environment. In one aspect of the present invention, the user manager and security module is provided as an application using 128 bit encryption via SSL. Users may be authenticated at a login stage and may be required to enter three items of identification including, for example, store ID, user ID, and password. Security within the application may be administered via permission assignments to users and groups.

Figure 12:
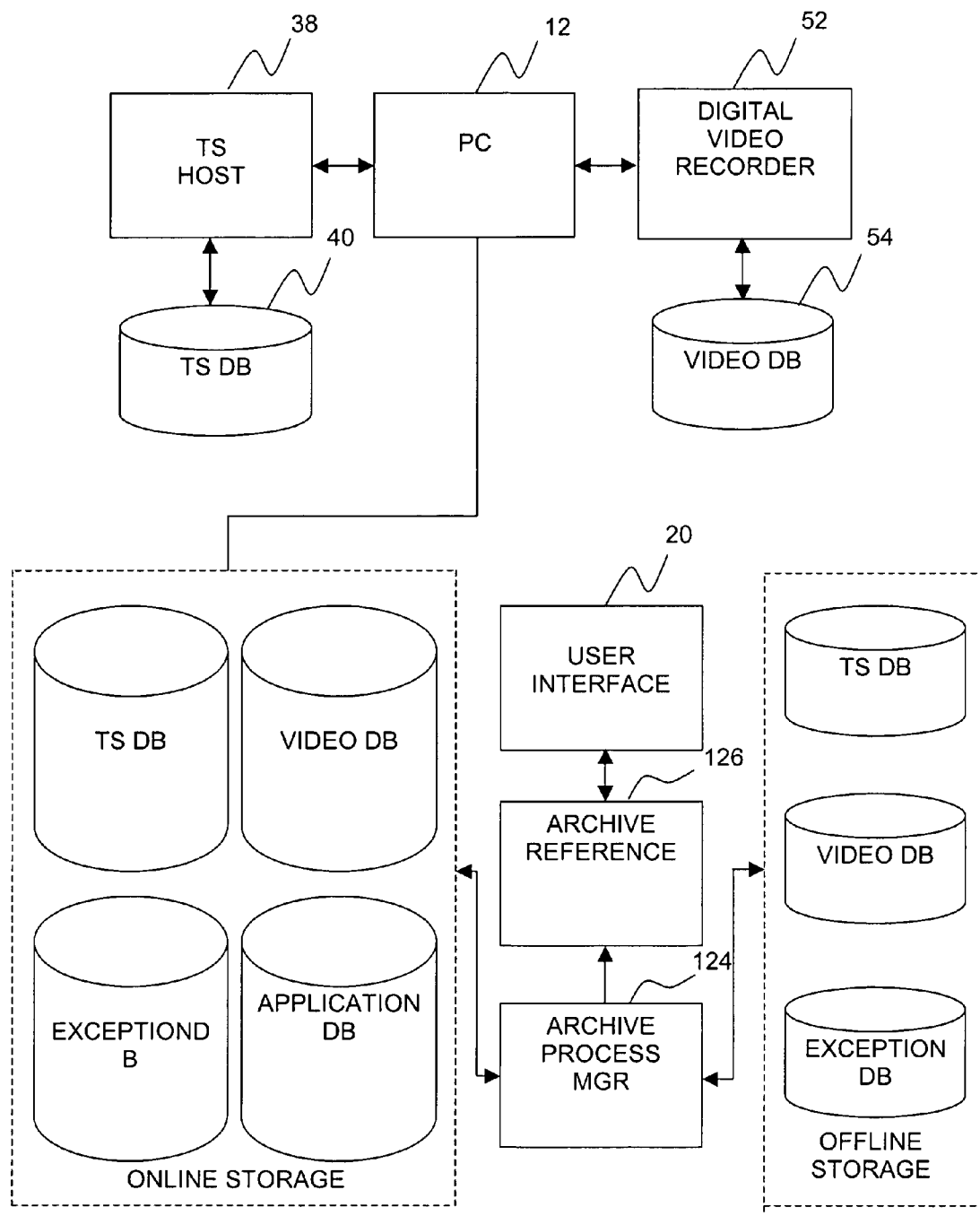
FIG. 12 is a schematic block diagram of an exemplary storage and archival portion of the software machine referenced in FIG. 2.

FIG. 12 illustrates a schematic block diagram of the storage and archival portion 28 of the software machine 14 referenced in FIG. 2.

In one aspect of the present invention the ability to store and archive transactional data, video data, application data, and exception data and other types of application systems data, either online or offline, is provided. Accordingly, access may be provided by the user interface 20 to online or offline archive and storage databases. Online or offline access to transaction data, video data, exception data, and application data is managed through an archival process manager 124 and an archive reference module 126 that communicates with the user interface 20.

Accordingly, the principles of the present invention may provide functions to prevent losses within a retail environment, as already discussed in detail above. However, the principles of the present invention are instantly translatable as tools toward merchandising and marketing research of products, transactional environment, customer service effects, etc. In one aspect of the present invention, existing video surveillance systems may be directed toward consumers participating in a transactional event. Accordingly, the aforementioned POS transactional data may be coupled to video of actual consumers at the point of sale to provide marketing research tools. Such a marketing research tool would enable businesses to define their target audiences for specific products using extremely accurate and reliable data, thereby eliminating the need for time consuming surveys or test groups.

According to the principles of the present invention, exception analysis of point-of-sale transactional data may be combined with recorded digital video. Accordingly, the present invention has the capability to optimize the amount of time spent by loss prevention managers and security officers to pinpoint fraud within a transactional environment.

It should be emphasized that the above-described embodiments of the present invention are merely possible examples of implementations, merely set forth for the benefit of the reader to clearly disclose the basic principles of the invention. It will be apparent to those skilled in the art that various modifications and variation can be made in the present invention without departing from the spirit or scope of the invention. Thus, it is intended that the present invention cover the modifications and variations of this invention provided they come within the scope of the appended claims and their equivalents.

What is claimed is:

1. A method of integrating and characterizing data from a plurality of electronic systems, said method comprising the following steps:
   coupling each of a plurality of electronic systems to a central control system;
   receiving and interfacing at least one datastream from each of the plurality of electronic systems to yield a collection of assembled data;
   sorting and organizing the assembled data from the plurality of electronic systems to formulate a collection of discrete events, wherein the discrete events are independent from the assembled data and are relayed to a dedicated storage medium;
   comparing the events formulated in said step of sorting and organizing to one or more predetermined event definitions;
   pro-actively identifying as exceptions selected events from said comparing step;
   correlating supplemental time-synchronized data to selected events of the identified exceptions; and
   providing notification to a user of the identified exceptions.

2. The method of integrating and characterizing data as in claim 1, wherein said plurality of electronic devices includes two or more of a point of sale (POS) system, a video recording system, a burglar/alarm system, an electronic article surveillance system, an access control system, an automatic teller machine (ATM), a gas pump, an RFID detection system, a metal detector system, and a telemetry system.

3. The method of integrating and characterizing data as in claim 1, wherein said discrete events formulated in said sorting and organizing step comprise product identification data from a point of sale transaction terminal.

4. The method of integrating and characterizing data as in claim 1, wherein said discrete events formulated in said sorting and organizing step comprise product sales location information from a point of sale transaction terminal.

5. The method of integrating and characterizing data as in claim 1, wherein said discrete events formulated in said sorting and organizing step comprise customer demographic data from a point of sale transaction terminal.

6. The method of integrating and characterizing data as in claim 1, wherein said discrete events formulated in said sorting and organizing step comprise scan gap time data from a point of sale transaction terminal.

7. The method of integrating and characterizing data as in claim 1, wherein said discrete events formulated in said sorting and organizing step comprise register line count information for a given retail environment.

8. The method of integrating and characterizing data as in claim 1, wherein said discrete events formulated in said sorting and organizing step comprise shopping cart location information for a given retail environment.

9. The method of integrating and characterizing data as in claim 1, wherein said discrete events formulated in said sorting and organizing step comprise customer traffic pattern information for a given retail environment.

10. The method of integrating and characterizing data as in claim 1, wherein said method is performed via web-based software provided on one or more remote computer systems.

11. The method of integrating and characterizing data as in claim 10, wherein said web-based software is accessible via the Internet.

12. The method of integrating and characterizing data as in claim 1, wherein said method is performed in conjunction with an operating system provided on one or more computers.

13. The method of integrating and characterizing data as in claim 1, further comprising a step of assembling selected events, identified exceptions and other predetermined information into a collective information grouping for subsequent independent processing.

14. A computer-based platform for integrating a plurality of electronic systems and correlating information outputs therefrom, said computer-based platform comprising:
   at least one interface module for establishing a connection between the computer-based platform and selected of the plurality of electronic systems and for obtaining data from said selected of the plurality of electronic systems;
   a user interface for creating and maintaining user-defined criteria for characterizing the data from said plurality of electronic systems and for defining one or more event types associated with the data received from said plurality of electronic systems;
   a data-processing procedure for transforming the data from said plurality of electronic systems into a common format, parsing the commonly formatted data collected from said plurality of electronic systems, and posting independent data events identified within the commonly formatted data to an associated storage medium;
   an exception identification procedure for determining when events identified via the data-processing procedure meet or exceed a trigger definition, thus corresponding to an exception; and
   a notification engine for proactively relaying notification information regarding selected events and exceptions to a user.

15. The computer-based platform of claim 14, wherein said plurality of electronic systems includes two or more of a point of sale (POS) system, a video recording system, a burglar/alarm system, an electronic article surveillance system, an access control system, an automatic teller machine (ATM), a gas pump, an RFID detection system, a metal detector system, and a telemetry system.

16. The computer-based platform of claim 14, wherein said independent data events posted by said data-processing procedure comprise product identification data from a point of sale transaction terminal.

17. The computer-based platform of claim 14, wherein said independent data events posted by said data-processing procedure comprise product sales location information from a point of sale transaction terminal.

18. The computer-based platform of claim 14, wherein said independent data events posted by said data-processing procedure comprise customer demographic data from a point of sale transaction terminal.

19. The computer-based platform of claim 14, wherein said independent data events posted by said data-processing procedure comprise scan gap time data from a point of sale transaction terminal.

20. The computer-based platform of claim 14, wherein said independent data events posted by said data-processing procedure comprise register line count information for a given retail environment.

21. The computer-based platform of claim 14, wherein said independent data events posted by said data-processing procedure comprise shopping cart location information for a given retail environment.

22. The computer-based platform of claim 14, wherein said independent data events posted by said data-processing procedure comprise customer traffic pattern information for a given retail environment.

23. The computer-based platform of claim 14, wherein said user interface is accessible via the Internet.

24. The computer-based platform of claim 14, wherein said user interface is accessible via a computer operating system.

25. The computer-based platform of claim 14, further comprising a grouping tool configured to assemble selected independent data events, identified exceptions and other predetermined information into a collective information grouping for subsequent independent processing.

26. The method of integrating and characterizing data as in claim 1, wherein said discrete events formulated in said sorting and organizing step comprise alarm system activations.

27. The method of integrating and characterizing data as in claim 1, wherein said discrete events formulated in said sorting and organizing step comprise access control system activations.

28. The method of integrating and characterizing data as in claim 1, wherein said step of correlating supplemental time-synchronized data to selected events of the identified exceptions comprises pulling a predetermined time segment of video for determining personal identity.

29. The method of integrating and characterizing data as in claim 1, wherein said step of providing notification to a user of the identified exceptions comprises sending one or more of an SMTP message, an e-mail message, and a message to a personal digital assistant (PDA).

30. The method of integrating and characterizing data as in claim 1, further comprising a step of assembling a grouping of information associated with one or more selected events or exceptions for relay to a reviewing user.

31. The method of integrating and characterizing data as in claim 1, wherein the grouping of information provided in said assembling step comprises at least one interactive link to initiate one or more of adding supplemental notes, adding research, and marking information as reviewed.

32. The computer-based platform of claim 14, further comprising a video correlation procedure for pulling a predetermined time segment of video from a video database for each event identified from the exception identification procedure.

33. The computer-based platform of claim 32, wherein:
   said independent data events posted by said data-processing procedure comprise one or more of alarm system activations and access control system activations in a given security environment; and
   said video segments are configured for determining personal identity of participants in the system activation events.

34. The computer-based platform of claim 14, wherein said notification engine is configured to send notification to a user by one or more of sending an SMTP message, sending an e-mail message, and sending a message to a personal digital assistant (PDA).

35. The computer-based platform of claim 14, further comprising a grouping tool for assembling a grouping of information associated with one or more selected events or exceptions for relay to a reviewing user.

36. The computer-based platform of claim 35, wherein the grouping of information assembled via said grouping tool comprises at least one interactive link to initiate one or more of adding supplemental notes, adding research, and marking information as reviewed.

* * * * *